April 28, 1925.  1,536,006

W. H. L. HOWARD

GLARE ELIMINATOR FOR AUTOMOBILES

Filed July 20, 1922   2 Sheets-Sheet 1

Inventor
William H. L. Howard
By Harry J. Riley
Attorney

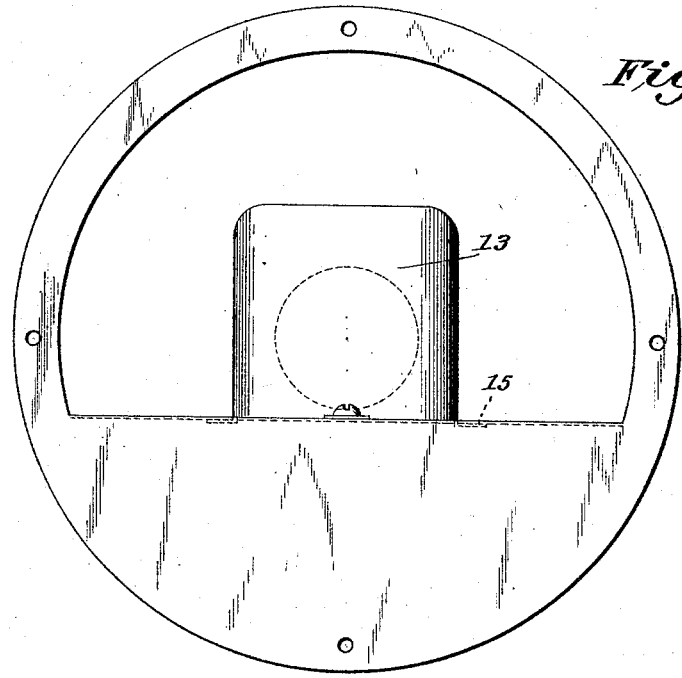
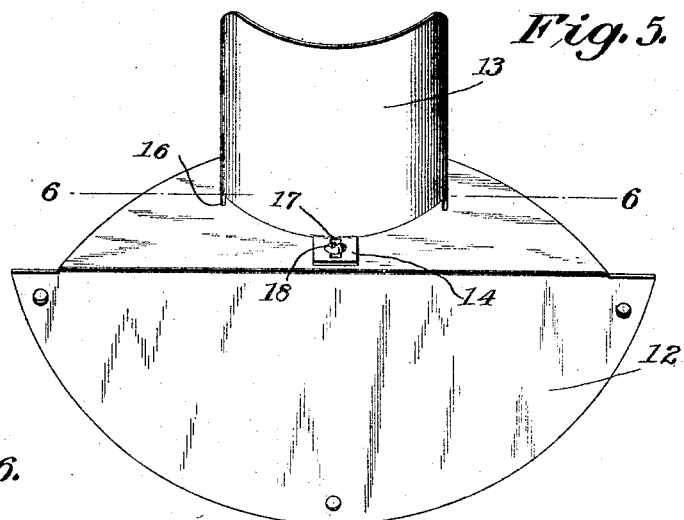
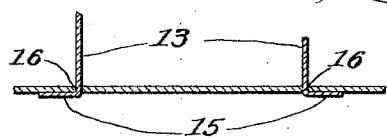

Patented Apr. 28, 1925.

1,536,006

UNITED STATES PATENT OFFICE.

WILLIAM H. L. HOWARD, OF WASHINGTON, DISTRICT OF COLUMBIA.

GLARE ELIMINATOR FOR AUTOMOBILES.

Application filed July 20, 1922. Serial No. 576,345.

*To all whom it may concern:*

Be it known that I, WILLIAM H. L. HOWARD, a citizen of the United States, residing at Washington, in the District of Columbia, have invented certain new and useful Improvements in Glare Eliminators for Automobiles, of which the following is a specification.

The invention relates to a glare eliminator for automobiles.

The object of the present invention is to provide for the headlights of automobiles and various other motor vehicles, a simple, practical and efficient device adapted to be easily and cheaply manufactured and capable of being readily applied to the headlights of various motor vehicles without necessitating any alteration in the construction thereof and of effectively eliminating the rays which dazzle and confuse anyone approaching an automobile.

Another object of the invention is to provide a strong and durable device of this character equipped with an adjustable combined shield and reflector adapted to be readily arranged to position it properly with relation to the electric bulb of a headlight and capable of throwing the light rays from directly in front of the electric light bulb to the reflector and of shielding the electric light bulb from view so that the rays of light will be thrown forward by the reflector of the head light in a manner and direction which will not dazzle and confuse persons in front of the same.

Another object of the invention is to provide a glare eliminator adapted to cut out the lower portion of a circular reflector and obscure the said portion so that only the upper portion will be effective whereby the rays of light will be thrown downwardly and forwardly upon the roadbed without confusing or dazzling either pedestrians or other operators of motor vehicles.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 4 is a front elevation illustrating another form of the invention having segmental upper and lower portions.

Figure 5 is a perspective view of another form of the invention having a segmental portion.

Figure 6 is a detail view illustrating the arrangement of the rear lugs.

Figure 2:
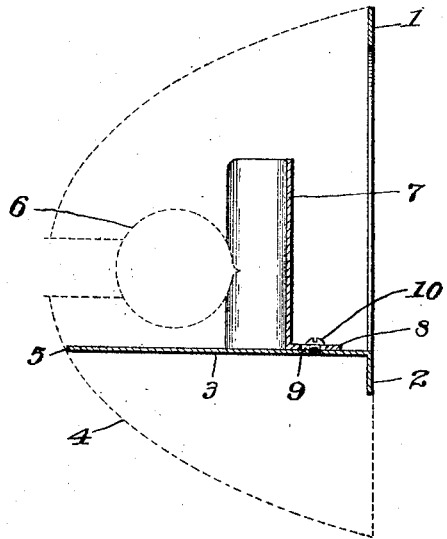
Figure 2 is a central vertical sectional view of the same, shown applied to a reflector and electric light bulb, the bulb and reflector being indicated in dotted lines.
Figure 3:
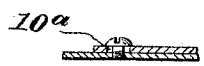
Figure 3 is a detail sectional view of one of the side attaching means.

In the accompanying drawing in which is illustrated the preferred embodiment of the invention the headlight glare eliminator, the device comprises in its construction a substantially segmental front frame composed of a curved approximately semi-circular upper portion 1 and a horizontal connecting bottom portion 2 formed integral with each other and with a horizontal rearwardly extending combined support and shield 3. The curved or semi-circular portion 1 forms the top and sides of the front frame and is adapted to be arranged at the front edge of the reflector 4 of a headlight, as illustrated in dotted lines in Figure 2 of the drawing. The horizontal combined support and shield extends rearwardly from the upper edge of the horizontal portion 2 and it is provided with a curved rear edge 5, which conforms to the configuration of the reflector and is adapted to obscure or cut off from the electric light bulb 6, the lower portion of the reflector so that none of the rays of light from the electric light bulb will be thrown upwardly by the said lower portion of the reflector. The front frame and the combined support and shield 3 are preferably formed by stamping or otherwise from a single piece of sheet metal or other suitable material and the material cut to form the opening defined by the front frame forms a horizontal support and shield.

Mounted upon the horizontal support and shield 5 is a vertical combined shield and reflector 7 constructed of sheet metal or other suitable material and located directly in front of the electric light bulb 6 so as to entirely obscure the same from view at the front of the device. The combined shield and reflector 7 extend above the electric light bulb while the supporting shield extends rearwardly below the electric light bulb to the back of the reflector. The said combined shield and reflector 7 is provided at the base with an arcuate attaching flange 8 arranged flat upon the horizontal support 3 and provided with a central slot 9 and side openings 10ᵃ for the reception of screws 10 or other suitable fastening devices for securing the combined shield and reflector adjustably to the support 3. The combined shield and reflector is capable of a partial rotary adjustment to position it properly with relation to the electric light bulb and it has a non-reflecting front or outer face and a reflecting rear or inner face adapted to throw the light rays from the lamp 6 backward to the reflector to be thrown by the same downwardly and forwardly upon the roadbed. The rear reflecting face of the combined shield and reflector can, of course, be eliminated if desired, and while it is preferable to construct the device of sheet metal any other suitable material may be employed. Also any suitable means may be employed for securing the attachment to a headlight and it may be detachably held in position by the door of the headlight. The device may be easily and quickly applied to headlights without altering the construction thereof and in practice it will be constructed in sizes to suit and fit the standard headlights of automobiles and other motor vehicles. The central slot 9 permits a back and forward adjustment of the combined shield and reflector toward and from the bulb or lamp and side openings 10ᵃ are designed to be of sufficient size to accommodate this adjustment.

In Figure 4 of the drawings is illustrated another form of the invention in which the frame is provided with a solid or closed depending semi-circular lower portion 11 in addition to the open semi-circular upper portion. The open approximately semi-circular or segmental upper portion and semi-circular or segmental lower portion cooperate to form a circular insert adapted to be readily fitted into a headlight.

Figure 1:
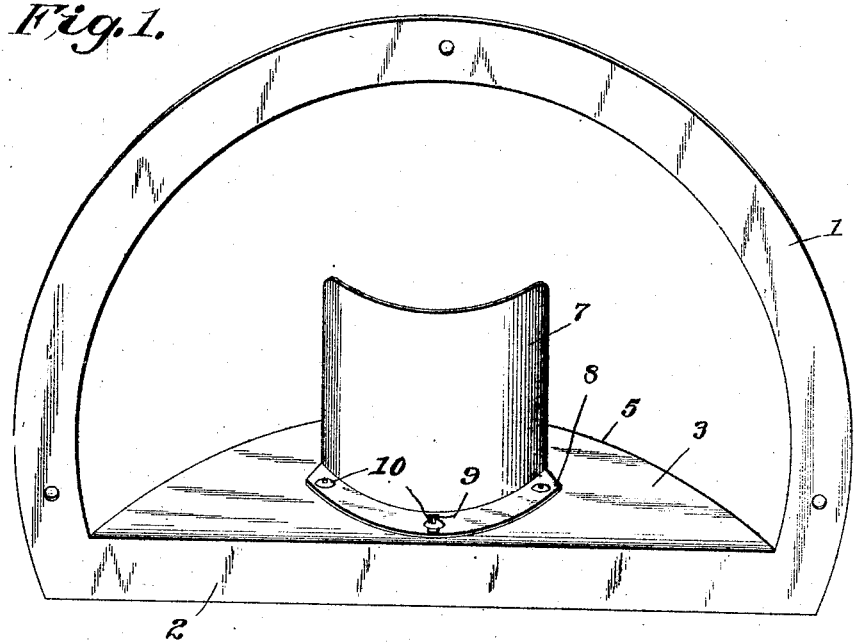
Figure 1 is a perspective view of a headlight glare eliminator constructed in accordance with this invention.

In Figure 5 of the drawings the semi-circular open upper portion is omitted and a solid lower segmental portion 12 is employed and constitutes the attaching means for securing the device to the headlight of an automobile or other motor vehicle. The front frames shown in Figures 1, 4 and 5 are designed to be provided with suitable perforations, as shown for the reception of screws or other suitable fastening devices for attaching the device to a headlight. In each of the forms of the invention shown in Figures 4 and 5, the rearwardly extending segmental support and shield has mounted upon it a combined shield and reflector 13 constructed substantially the same as that shown and described and provided at the front with a forwardly extending lug 14 and at opposite sides with rear depending substantially L-shaped lugs 15 arranged in slots 16 of the combined shield and support and adjustable backwardly and forwardly similar to the said combined shield and reflector 7. The shield and reflector 13 is provided at its front lug with a central slot 17 for the reception of a screw 18 which secures the combined shield and reflector 13 in its adjustment. The lugs 15 project laterally as shown in Figure 6 of the drawing and retain the rear portion of the reflector in proper position and prevent the same from becoming disconnected from the combined shield and support.

What is claimed is:

1. An attachment for eliminating the glare from headlights comprising a substantially segmental front frame arranged to close the lower portion of the headlight at the front thereof, a rearwardly extending approximately segmental support adapted to fit a reflector and cut off the lower portion of the same entirely from the lamp of the headlight and a curved shield extending upwardly from the support and arranged in front of the lamp.

2. An attachment for eliminating the glare from headlights including a front frame or member, a rearwardly extending support arranged beneath the lamp of the headlight and adapted to fit the reflector and entirely cut off the lower portion thereof from the lamp, and a vertical shield arranged in front of the lamp and curved to extend partially around the same and provided at the base with an attaching flange having means for adjustably securing the shield to the support.

3. An attachment for headlights comprising a substantially segmental front frame fitting the headlight of a reflector at the front thereof and closing the lower portion of the front of the same and an approximately segmental support cut from the material forming the front frame and adapted to fit the reflector of a headlight and entirely cut off the lower portion thereof from the lamp thereof, and a shield arranged in front of the lamp and mounted upon the said support.

4. An attachment for headlights comprising a front vertical frame having a curved marginal edge to fit a headlight and provided with an integral rearwardly extending substantially segmental support arranged horizontally so as to extend beneath the lamp of the headlight and cut out entirely the lower portion of the reflector of the said headlight, and a vertical shield mounted upon the support in front of the lamp of the headlight.

5. An attachment for headlights comprising a front vertical frame having a curved marginal edge to fit a headlight and provided with an integral rearwardly extending substantially segmental support arranged horizontally so as to extend beneath the lamp of the headlight and cut out entirely the lower portion of the reflector of the said headlight, and a vertical shield mounted upon the support in front of the lamp of the headlight, said shield being provided at opposite sides with lugs slidably interlocked with the support and a lug extending from the center of the shield at the front thereof and adjustably secured to the support.

6. An attachment for headlights comprising a front frame having a substantially segmental open upper portion and provided with a horizontal rearwardly extending substantially segmental support so as to extend beneath the lamp of the headlight and cut out entirely the lower portion of the reflector of the same, and a vertical shield mounted upon the support in front of the lamp of the headlight.

7. An attachment for headlights comprising a front frame having a rearwardly extending substantially segmental support arranged to extend beneath the lamp of the headlight, and cut out entirely the lower portion of the reflector thereof and provided at the front thereof with a solid depending segmental portion, and a vertical shield mounted upon the support in front of the lamp of the headlight.

8. An attachment for headlights comprising a front frame having a rearwardly extending substantially segmental support arranged to close the lower portion of the reflector of the headlight to the lamp thereof and provided at the front thereof with a solid depending segmental portion, said frame being also provided with an open substantially segmental upper portion, and a vertical shield mounted upon the support in front of the headlight of the lamp.

In testimony whereof I affix my signature.

WILLIAM H. L. HOWARD.